United States Patent [19]

Peter

[11] Patent Number: 4,572,310

[45] Date of Patent: Feb. 25, 1986

[54] DRIVE SYSTEM FOR A VEHICLE

[75] Inventor: Timothy J. Peter, Waukesha, Wis.

[73] Assignee: Ransomes, Inc., Johnson Creek, Wis.

[21] Appl. No.: 635,570

[22] Filed: Jul. 30, 1984

[51] Int. Cl.[4] ............................................. B62D 11/00
[52] U.S. Cl. ...................................... 180/6.24; 192/49
[58] Field of Search ...................... 180/6.64, 6.26, 6.24, 180/6.6, 24.1, 24.09, 292, 293, 71, 73.1, 333; 192/50, 49, 48.1, 13 R, 18 R

[56] References Cited

U.S. PATENT DOCUMENTS

| | | | |
|---|---|---|---|
| 759,559 | 5/1904 | Scott | 192/49 X |
| 904,687 | 11/1908 | Donahoe | 180/6.24 |
| 995,291 | 6/1911 | Robinson | 180/6.24 X |
| 1,318,894 | 10/1919 | Mapes | 180/6.26 |
| 1,323,051 | 11/1919 | Hartsough | 180/6.26 X |
| 2,789,646 | 4/1957 | Bobard | 192/50 X |
| 3,190,385 | 6/1965 | Allfort | 180/6.66 |
| 3,335,808 | 8/1967 | Schaich | 180/6.5 |
| 3,925,970 | 12/1975 | Rusco | 56/14.7 |

*Primary Examiner*—Harry Tanner

*Attorney, Agent, or Firm*—Andrus, Sceales, Starke & Sawall

[57] ABSTRACT

A drive system for a tractor. The output from a hydrostatic transmission is connected to the rotatable input member of a differential, while the output shafts of the differential are each connected to a drive wheel of the tractor. A clutch interconnects one output shaft of the differential with the input member, and when the clutch is engaged, the output shafts will rotate at the same speed, acting as a solid axle. The steering column of the tractor is connected to a steerable wheel, and when the steering column is rotated through a predetermined arc of about 15°, a linkage interconnecting the steering column and the clutch act to disengage the clutch, so that the drive wheels are permitted to rotate at different speeds. Rotation of the steering column through a greater arc of about 80° will automatically operate a brake associated with the inside wheel in the turn. At higher speeds, rotation of the steering column through a given arc will also automatically reduce the speed of the hydrostatic transmission to eliminate possible instability in a tight turn.

11 Claims, 6 Drawing Figures

FULL FORWARD POSITION
LIMITED FORWARD POSITION
NEUTRAL POSITION
REVERSE POSITION

DRIVE SYSTEM FOR A VEHICLE

BACKGROUND OF THE INVENTION

Hydrostatic transmissions are commonly used in small riding tractors and the output of the hydrostatic transmission is transmitted to the input member or housing of a differential, while the output shafts of the differential are connected to the tractor drive wheels. Without a differential, both drive wheels will continually rotate at the same speed, which can cause scalping of the lawn when the tractor is moved in a tight turn. However, with the use of a differential, the drive wheel that encounters the least resistance will operate at the greatest speed. For example, if the tractor is moving in a straight path across a hill, the uphill wheel will have less resistance and therefore will operate at the greatest speed. This can cause spinning of the uphill wheel and possible scuffing of the lawn.

Drive systems have been used in the past, such as shown in the U.S. Pat. Nos. 3,190,385 and 3,335,808, in which rotation of the steering column acts to increase the speed of one drive wheel when cornering, while decreasing the speed of the other drive wheel.

SUMMARY OF THE INVENTION

The invention is directed to an improved drive system for a riding tractor which is controlled by the operation of the steering column. In accordance with the invention, the output drive from a hydrostatic transmission is transmitted to the input member or housing of a standard differential, and the output shafts of the differential are each connected to a drive wheel of the tractor. A clutch interconnects one of the output shafts of the differential with the differential housing and the clutch is adapted to be engaged when the tractor is moving in a straight-ahead path of travel. With the clutch engaged the output shafts will rotate at the same speed, acting as a solid axle.

A steering column is connected in a conventional manner to a steerable wheel, and when the steering column is rotated through a predetermined arc of about 15°, a linkage interconnecting the steering column and the clutch operates to disengge the clutch so that the drive wheels are then permitted to rotate at different speeds.

Rotation of the steering column through a greater arc of about 80° will automatically operate a brake mechanism associated with the inside drive wheel in the turn to thereby brake that drive wheel during cornering.

As an added feature of the invention, at higher speeds, rotation of the steering column through a given arc will also automatically decrease the speed of the hydrostatic transmission to thereby reduce the speed of the tractor during cornering to prevent possible instability in a tight turn.

With the drive system of the invention, four separate functions are controlled by operation of the steering column. First, rotation of the steering column acts, in a conventional manner, to turn the steerable wheel to steer the tractor.

Second, at a straight ahead driving condition, the differential will be locked so that both drive wheels will operate at the same drive speed and rotating the steering column through an arc of about 15° will release the differential lock to thereby enable the drive wheels to rotate at different speeds.

Third, further rotation of the steering column through an arc of about 80° will operate the brake associated with the drive wheel in the inside of the turn to brake the inside drive wheel and prevent wheel spinning.

As a fourth function, rotation of the steering column at high speed travel will act to reduce the speed of the hydrostatic transmission to decrease the tractor speed during cornering.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
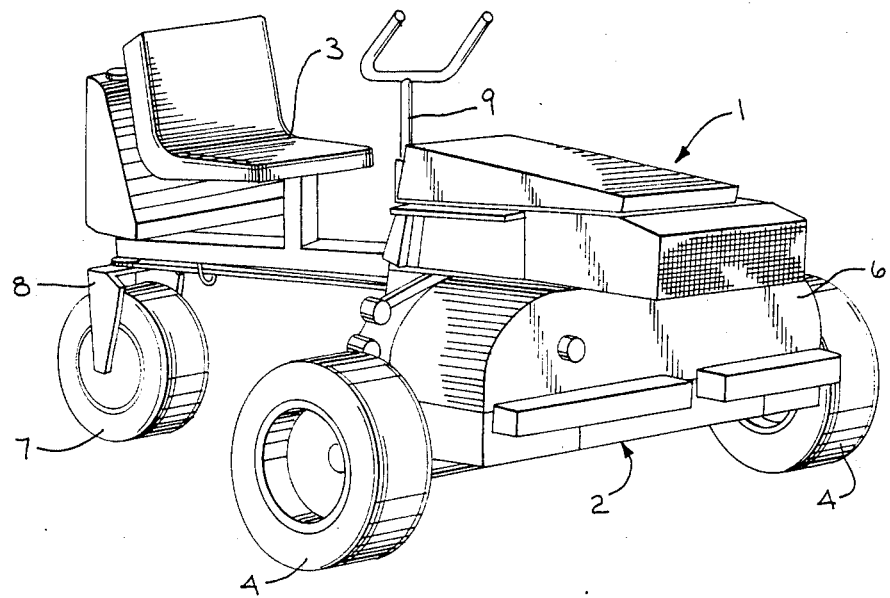
FIG. 1 is perspective view of a small riding tractor incorporating the drive system of the invention.

FIG. 1 shows a small riding tractor 1 incorporating the drive system of the invention. Tractor 1 includes a chassis or frame 2 which supports a driver's seat 3. A pair of drive wheels 4 are mounted at the forward portion of the tractor on either side of the chassis and the drive wheels 4 are driven through the drive system of the invention by means of a hydrostatic transmission 5 which is located in a housing or shroud 6 carried by the chassis 2. The tractor 1 is steered by means of a steerable rear wheel 7 that is pivotally mounted through bracket 8 to the rear portion of the chassis 2.

Figure 5:
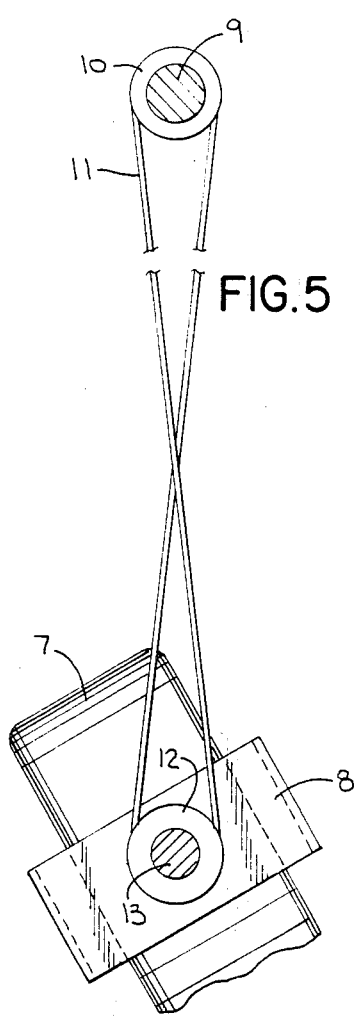
FIG. 5 is a plan view showing the mechanism for steering the steerable wheel.

Rear wheel 7 is pivoted through operation of steering column 9. FIG. 5 illustrates the manner in which the steering column 9 is interconnected with the steerable rear wheel 7. A pulley 10 is mounted on column 9 and a cable 11 is pinned to pulley 10. Cable 11 is disposed in an X-shaped configuration and is trained over a pulley 12 mounted on bracket 8 which carries the wheel 7. Bracket 8 is pivotally connected to chassis 2 through vertical shaft 13. With this arrangement, rotation of the steering column 9 will pivot the steerable wheel 7 to steer the tractor 1.

Figure 2:
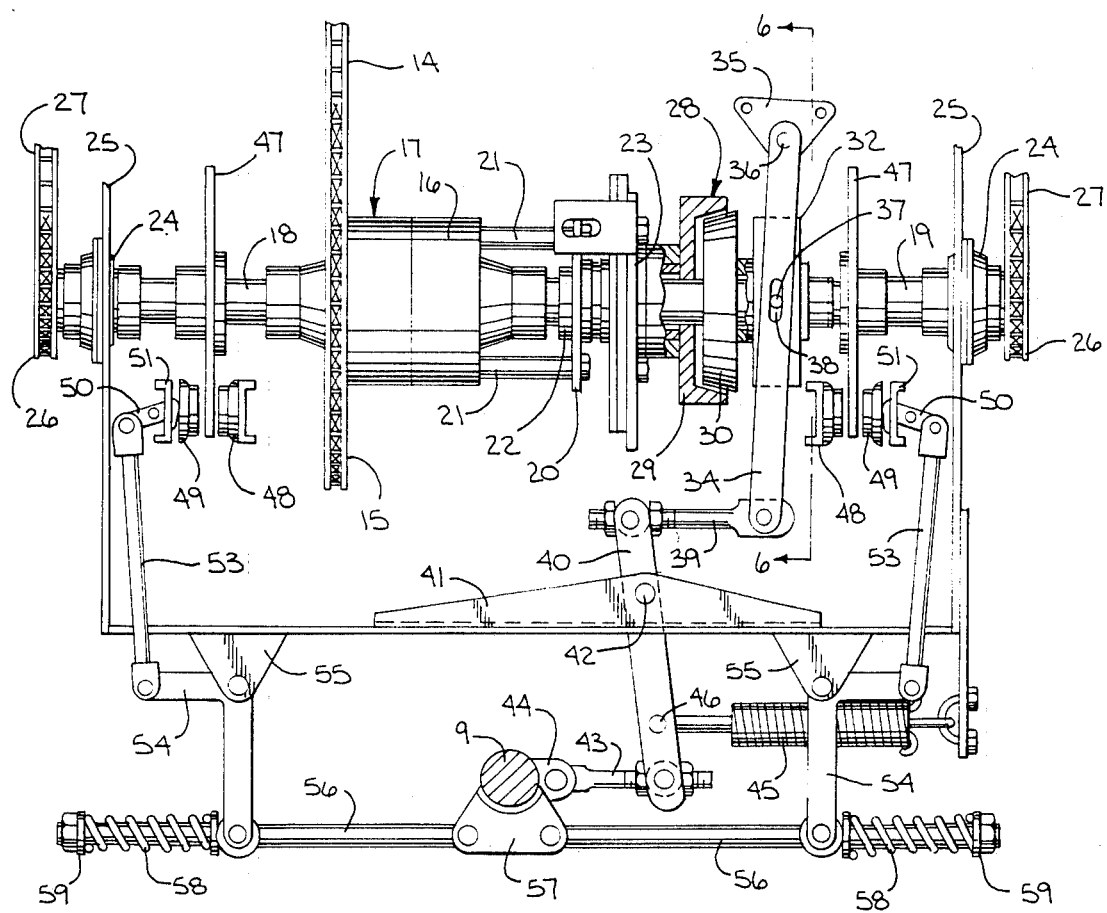
FIG. 2 is a top plan view of the drive system showing the tractor in a straight ahead driving position.

As shown in FIG. 2, a chain drive 14 interconnects the output shaft of hydrostatic transmission 5 with a sprocket 15 that is secured by bolts to the housing or input member 16 of differential 17. Differential 17 is a conventional type and can be constructed in the manner disclosed in U.S. Pat. No. 3,406,592.

Differential 17 also includes a pair of output shafts 18 and 19 which extend in opposite directions from housing 16.

Plate 20 is connected to housing 16 by a series of elongated spacers 21, and sleeve 22 is mounted within an opening in plate 20 and surrounds output shaft 19. Bearing assembly 23 is connected to sleeve 22 and serves to journal the shaft 19 for rotation.

The outer ends of output shafts 18 and 19 are journaled within bearing assemblies 24 which are mounted within openings in the side walls 25 of chassis 2. The outer end of each shaft 18 and 19 carries a sprocket 26 which is connected by chain drive 27 to the respective drive wheel 4.

Figure 6:
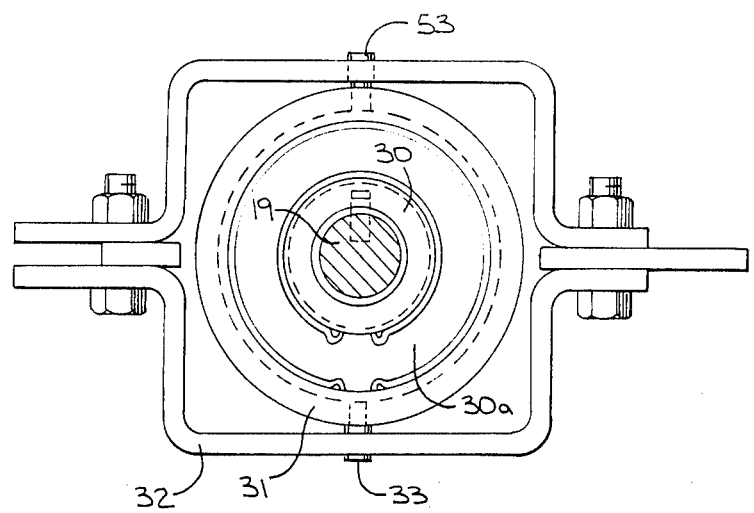
FIG. 6 is a section taken along line 6—6 of FIG. 2.

In accordance with the invention, a clutch assembly 28 interconnects the rotatable housing 16 of differential 17 and the output shaft 19. Clutch assembly 28 includes an outer cup-shaped clutch member 29 having a generally conical inner surface, and the hub of member 29 is secured to sleeve 22 and rotates with sleeve 22 and housing 16. In addition, clutch assembly 28 also includes an inner clutch member 30 that is keyed to shaft 19 and has an outer conical surface which is received within the open end of outer clutch member 29. The hub of clutch member 30 is journalled by bearing assembly 30a within sleeve 31 and sleeve 31 is attached to a generally square-shaped outer bracket 32 through pins 33, as best shown in FIG. 6.

Inner clutch member 30 is mounted to move axially of shaft 19 into and out of engagement with clutch member 29 through operation of a lever 34. One end of lever 34 is pivotally connected to bracket 35 connected to chassis 2 at pivot 36, while the central portion of lever 34 is connected to bracket 32 through a pivot 33 that moves within a slot 38 formed in lever 34.

As shown in FIG. 2, the opposite end of lever 34 is pivotally connected to one end of a rod 39, which in turn is pivoted to an end of arm 40. The central portion of arm 40 is pivoted to a bracket 41 attached to chassis 2 by pivot 42, while the opposite end of arm 40 is pivoted to an end of rod 43. As illustrated in FIG. 2, rod 43 is pivoted to a lug 44 secured to steering column 9. With the linkage composed of lever 34, rod 39, arm 40 and rod 43, rotation of steering column 9 through an arc of about 15°, from the forward or straight ahead position, will move the inner clutch member 30 out of engagement with clutch member 29 to disengage the clutch.

When the tractor is moving straight ahead, the inner clutch member 30 is biased to the engaged position by extension spring 45. One end of spring 45 is connected to side wall 25, while the opposite end of the spring is engaged with a pin 46 on arm 40. The force of spring 45 will act through arm 40, rod 39 and arm 34 to move the inner clutch member to the engaged position. With the clutch engaged, shaft 19 will be tied directly to housing 16 of differential 17 so that shafts 18 and 19 will rotate in unison, as a solid axle. When the steering column 9 is rotated in either direction through a predetermined arc, generally about 15°, the clutch will be disengaged to permit each shaft 18 and 19 and the respective drive wheel 4 to rotate independently.

Figure 3:
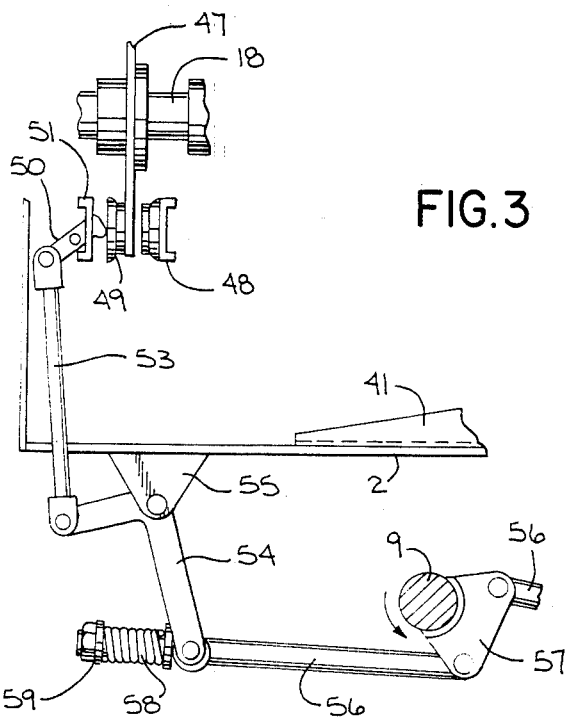
FIG. 3 is a fragmentary plan view showing the operation of the brake mechanism when cornering.

The drive system also includes a mechanism for automatically braking the inside drive wheel 4 in a turn. The brake mechanism includes a brake disc 47 which is secured to each of the shafts 18 and 19 of differential 17. Each brake disc 47 is adapted to be engaged in a conventional manner between a fixed caliper 48 and a movable caliper 49. Caliper 49 is connected to a pivotable actuating link 50 which extends through an opening in channel 51 and has a cam-shaped head that engages the pad assembly of caliper 49. The opposite end of link 50 is connected through cable 53 to one end of crank arm 54 that is pivoted to lug 55 on chassis 2. As shown in FIGS. 2 and 3, the opposite end of each crank arm 54 is mounted for sliding movement on a rod 56, while the inner end of each rod 56 is pivoted to a generally triangular bracket 57 secured to steering column 9. A compression spring 58 is mounted between a spring seat 59 threaded on the end of each rod 56 and the end of crank arm 54. With this arrangement, rotation of steering column 9 from the straight ahead position of FIG. 2 through a predetermined arc of about 80° will pivot the crank arm 54 to operate the brake associated with the drive wheel 4 on the inside of the turn to thereby brake that wheel. The use of spring 58 provides a type of lost motion connection which will prevent the brake from being actuated until the steering column has rotated through the given arc. For example, initial rotation of the steering column in the direction of the solid arrow in FIG. 3, will draw the left hand rod 56, as viewed in FIG., 3 to the right, thereby compressing spring 58. When the steering column has moved through an arc of about 80°, spring 58 will be compressed to a condition where continued rotation will thereafter pivot the crank arm 54 to operate the brake. In practice, when the steering column has moved through an arc of about 80° the brake will begin to be applied and the brake will be fully applied when the steering column has rotated through 90°.

Figure 4:
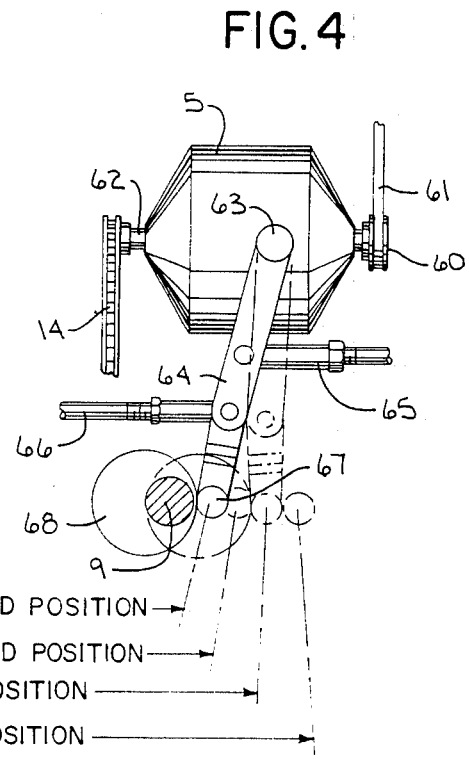
FIG. 4 is a plan view showing the speed control system.

As a safety feature, it is desirable to reduce the speed of the hydrostatic transmission when the tractor is turning or cornering. The mechanism for controlling the hydrostatic speed when cornering is best illustrated in FIG. 4. The input shaft 60 of hydrostatic transmission 5 is connected by a belt drive 61 to the output shaft of a gasoline engine and the output shaft 62 is connected by chain drive 14 to the differential 17, as previously described.

The speed and direction, i.e. forward or reverse, is controlled by a rotatable shaft 63 and a lever 64 is connected to shaft 63 and extends rearwardly toward the steering column. Link 65 which is connected in a standard manner to the forward-reverse pedal is pivoted to the lever 64 and in addition, a link 66, which is connected to a mechanism for biasing the foot pedal to a neutral position, is also connected to lever 64. The links 65 and 66 are standard mechanisms utilized with a hydrostatic transmissions and in themselves form no part of the invention.

Connected to the outer end of lever 64 is a roller or follower 67 which at high speed conditions, is adapted to engage a cam 68 which is eccentrically mounted on steering column 9.

As shown in FIG. 4, follower 67 will not engage cam 68 when the speed control lever 64 is in a reverse position, a neutral position, or a limited speed position. However, when the lever 64 is moved to a full forward speed position, follower 67 will engage the cam surface of cam 68.

FIG. 4 illustrates the straight ahead position of the tractor. When the steering column 9 is rotated and the lever 64 is in the full speed position, rotation of the cam 68 will move the lever 64 toward the neutral position, thereby progressively reducing the speed of the tractor as the tractor is turned or cornered. This mechanism prevents the tractor from operating at full speed during cornering and prevents instability during a tight turn.

With the drive system of the invention, four separate functions are controlled by rotation of the steering column. More particularly, rotation of the steering column operates in a conventional manner to pivot the steerable wheel 8 and turn the tractor.

When the tractor is moving in a straight ahead direction, clutch assembly 28 is in the engaged position, so that the output shafts 18 and 19 of differential 17 act as a solid axle and the speed of rotation of both drive wheels 4 will be the same. By rotating the steering column 9 through a first arc of about 15° on either side of the straight ahead position, the clutch assembly 28 will be disengaged to thereby permit the drive wheels to operative independently.

Further rotation of the steering column 9 to an arc of about 80° will apply the brake to the inside drive wheel in the turn, thereby aiding in the cornering and preventing slippage of the inside wheel.

As a further function, rotation of the steering column, when operating at high speed, will automatically reduce the speed during cornering.

Various modes of carrying out the invention are contemplated as being within the scope of the following claims particularly pointing out and distinctly claiming the subject matter which is regarded as the invention.

I claim:

1. A drive system for a vehicle, comprising a chassis, drive means mounted on the chassis and having an output shaft, a differential having an input member and a pair of output members, connecting means for connecting the output shaft to the input member of the differential, a pair of drive wheels, each of said drive wheels being connected to one of said output members, clutch means interconnecting said input member and one of said output members, said clutch means having an engaged position for operably connecting said input member to said one output member whereby both output members will rotate at the same speed, said clutch means having a disengaged position wherein said output members can rotate independently, a steerable wheel mounted on the chassis, a steering column mounted for rotation on the chassis and operably connected to the steerable wheel whereby rotation of said column will pivot said steerable wheel to turn said vehicle, means for moving said clutch means to the engaged position when said steerable wheel is in a straight ahead position, and means responsive to the steering column being rotated beyond a first arc on either side of said straight ahead position for disengaging said clutch means.

2. The drive system of claim 1, and including brake means operably connected to each drive wheel, and means responsive to rotation of said steering column in a first direction beyond a second arc substantially greater than said first arc to operate said brake means associated with one of said drive wheels.

3. The drive system of claim 2, wherein rotation of said steering column in said first direction causes the vehicle to turn in said first direction and to operate said brake means associated with the drive wheel on the inside of said turn.

4. The drive system of claim 1, wherein said drive means has a high speed forward position, and including means responsive to rotation of said steering column to either side of said straight ahead position when said drive means is in said high speed forward position for reducing the speed of said drive means.

5. A drive system for a vehicle, comprising a chassis, a hydrostatic transmission mounted on the chassis and having an output shaft, a differential having an input member operably connected to said output shaft and having a pair of output members, a pair of drive wheels, each of said drive wheels being connected to one of said output members, clutch means including a first clutch member connected to said input member and a second clutch member connected to one of said output members, a steerable wheel mounted for turning movement on said chassis, a steering column mounted for rotation on said chassis and operably connected to said steerable wheel, whereby rotation of said steering column will turn said steerable wheel to steer said vehicle, a linkage interconnecting said steering column and said second clutch member, said linkage when the steerable wheel is in the straight ahead position being operable to engage said second clutch member with said first clutch member whereby said drive wheels will rotate at the same speed, said linkage being operable when the steering column is rotated beyond a predetermined first arc on either side of said straight ahead position to disengage said second clutch member from said first clutch member and permit the drive wheels to rotate independently.

6. The drive system of claim 5 wherein said hydrostatic transmission has a rotatable speed and direction control member, a lever connected to said control member and rotatable therewith, cam means disposed on said steering column and having a cam surface disposed eccentrically of said column, rotation of said control member to a high speed position moving said lever into engagement with said cam surface, said cam surface being arranged so that rotation of the steering column to either side of said straight ahead position will cause said cam surface to move said lever and rotate the control member from said high speed position toward a neutral position.

7. The drive system of claim 5, and including brake means associated with each output member of said differential, and a second linkage connecting the steering column with each brake means, each second linkage being arranged so that rotation of said steering column in one direction beyond a second arc greater than said first arc from said straight ahead position will operate a first of said brake means to brake the corresponding drive wheel, and rotation of said steering column in a second direction beyond said second arc will operate the second of said brake means to brake the corresponding drive wheel.

8. The drive system of claim 7, and including a lost motion connection disposed in each second linkage to permit said steering column to rotate through a give arc without operating the brake means.

9. The drive system of claim 7, and including biasing means for biasing said second clutch member into engagement with said first clutch member.

10. The drive system of claim 6, wherein said control member also has a neutral position and a reverse position, said lever being spaced out of contact with said cam surface when said control member is in said neutral and reverse positions.

11. A drive system for a vehicle, comprising a chassis, drive means mounted on the chassis and having an output shaft, a differential having an input member and a pair of output members, connecting means for connecting the output shaft to the input member of the differential, a pair of drive wheels, each of said drive wheels being connected to one of said output members, clutch means interconnecting said input member and one of said output members, said clutch means having an engaged position for operably connecting said input member to said one output member whereby both output members will rotate at the same speed, said clutch means having a disengaged position wherein said output members can rotate independently, a steerable wheel mounted on the chassis, a steering column mounted for rotation on the chassis and operably connected to the steerable wheel whereby rotation of said column will pivot said steerable wheel to turn said vehicle, means for moving said clutch means to the engaged position when said steerable wheel is in a straight ahead position, means responsive to the steering column being rotated beyond a first arc on either side of said straight ahead position for disengaging said clutch means, brake means operably connected to each drive wheel, and means responsive to rotation of said steering column in a first direction beyond a second arc substantially greater than said first arc to operate said brake means associated with one of said drive wheels, said drive means having a high speed forward position, and means responsive to rotation of said steering column to either side of said straight ahead position when said drive means is in said high speed forward position for reducing the speed of said drive means.

* * * * *